United States Patent [19]

Gerth et al.

[11] 4,398,058
[45] Aug. 9, 1983

[54] MOISTURE-PROOFING ELECTRICAL CABLE

[75] Inventors: Dieter Gerth; Friedrich Schatz; Cornelius van Hove, all of Langenhagen, Fed. Rep. of Germany

[73] Assignee: Kabelmetal Electro GmbH, Hanover, Fed. Rep. of Germany

[21] Appl. No.: 245,143

[22] Filed: Mar. 18, 1981

[30] Foreign Application Priority Data

Mar. 27, 1980 [DE] Fed. Rep. of Germany ....... 3011868

[51] Int. Cl.³ .......................... H01B 7/18; H01B 9/02
[52] U.S. Cl. .................................. 174/106 D; 174/36; 174/102 D; 174/107
[58] Field of Search ................. 174/36, 102 D, 106 R, 174/106 D, 107; 228/130, 148; 29/474.1, 624

[56] References Cited

U.S. PATENT DOCUMENTS

| 1,979,402 | 11/1934 | Nyquist | 174/36 X |
|---|---|---|---|
| 3,293,351 | 12/1966 | Giaro | 174/105 R |
| 3,340,353 | 9/1967 | Mildner | 174/106 R |
| 3,405,228 | 10/1968 | Polizzano | 174/106 R |
| 3,555,169 | 1/1971 | Miller | 174/36 |
| 3,602,633 | 8/1971 | Miller et al. | 174/36 |
| 3,711,621 | 1/1973 | Jachimowicz | 174/106 D X |
| 4,010,315 | 3/1977 | Mildner | 174/107 |
| 4,083,484 | 4/1978 | Polizzano et al. | 174/106 D X |
| 4,109,099 | 8/1978 | Dembiak et al. | 174/107 |

FOREIGN PATENT DOCUMENTS 1540430 1/1970 Fed. Rep. of Germany .
2345432 3/1975 Fed. Rep. of Germany .

Primary Examiner—Volodymyr Y. Mayewsky
Attorney, Agent, or Firm—Ralf H. Siegemund

[57] ABSTRACT

Three stranded-together, insulated conductors are enveloped in a rubber-elastic, inner sleeve on which sits a corrugated twin tube arrangement of an inner copper tube and an outer steel tube. The corrugations seal the interior in a bulkhead-like fashion.

8 Claims, 3 Drawing Figures

MOISTURE-PROOFING ELECTRICAL CABLE

BACKGROUND OF THE INVENTION

The present invention relates to moisture-proofing electrical cables, particularly high-power cables having a synthetic insulation; and more particularly, the invention relates to a cable for three conductors with a common, metallic, corregated sleeve or envelope.

High-power cables generally are provided with a metal shield, being disposed over and above the insulation. The insulation may be covered with an outer, conductive, or more accurately, semiconductive layer; and the shield is provided on top of that layer. The shield is comprised, for example, of wires, metal ribbons, or the like, the material being, for example, copper. The metal shield as such has primarily an electrical function; however, German printed patent application No. 15 40 430 suggests already a combining of that function with a moisture-sealing function for preventing penetration of moisture into the insulation. The metal envelope is comprised in this instance of a metal ribbon which is longitudinally paid and folded around the insulated cable conductor. Overlapping ribbon edges are subsequently soldered in order to obtain the requisite sealing.

The shielded and moisture-proofed cable as per the German application No. 15 40 430 is disadvantaged by the fact that upon loading the cable and upon commensurate development of heat, the insulation expands more than the outer, closed metal envelope. The electrical insulation, after all, functions also as a terminal insulation so that the difference in radial expansion is not only the result of different coefficients of expansion, but the effective temperatures differ as well. Since the metal shield—tube—envelope is radially expandable to a limited extent only, one must expect the solder seam to rupture at any weak spot, or even over a large portion. Aside from these problems arising in the field and during use, the metal ribbon renders the cable rather stiff which interferes with the transport and reeling of the cable on drums as well as installation thereof.

One of the problems above has been avoided by corrugating the outer shield-envelope (German printed patent application No. 28 08 214). The cable as per that disclosure includes also features for compensating the difference in radial expansion of insulation and outer shield. The resulting cable does, indeed, avoid the outlined drawbacks. Still, special precautions are needed in those instances in which the cable is expected to experience significant abuse and wear, such as during installation in mines, or in underground sites generally, through rivers or lakes, or the like. The special precautions needed for these instances consist primarily in a particular armoring.

DESCRIPTION OF THE INVENTION

It is an object of the present invention to provide a new and improved cable which (a) is waterproof, (b) is shielded, (c) will not rupture the shield under load, and (d) affords outer, mechanical protection.

It is a specific object of the present invention to improve a cable construction which includes one or more insulated conductors as a cable core, including also a jacket or jacketing assembly.

In accordance with the preferred embodiment of the present invention, the cable core as per the specific object is improved by providing a twin corrugated metal tube around that core, the twin tube being comprised of a first, primarily conductive strip or tape, preferably of copper or aluminum, which has been longitudinally folded around the core and seam-welded along the edges, and of a second, primarily strong strip or tape, preferably a steel strip, which has been longitudinally folded around the first tube, also seam-welded along the edges and preferably drawn onto the first tube. This twin or dual tube assembly has been corrugated, the corrugation ridges being forced into the jacket or jacket assembly. This jacket is preferably a rubber-elastic envelope that includes or is coated with conductive material. Both of the tapes for the tubes are thin because little conductive cross section is needed for shielding, while even a thin steel tape (tube) is much stronger than a thick copper tube. Moreover, thin strip material is quite economical.

It should be noted that German printed patent application No. 23 45 432 discloses a coaxial cable in which the outer conductor is enveloped in iron, resulting from longitudinally folding and welding an iron strip. The iron shield has electromagnetic shielding functions for such an h-f cable. Moreover, this assembly is not provided nor suitable for moisture-proofing of a power cable; it will rust. The outer conductor of this coaxial cable is not at all protected, e.g., against moisture.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 2 is a longitudinal section through such a cable, as indicated by lines 2—2 in FIG. 1, and showing also the plane (1—1) of section in which FIG. 1 is taken.

Figure 1:
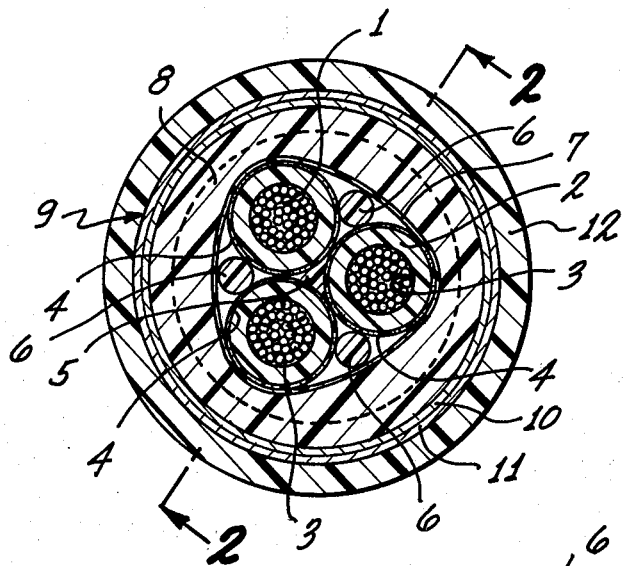
FIG. 1 is a cross section through a cable in accordance with the preferred embodiment of the invention.
Figure 2:
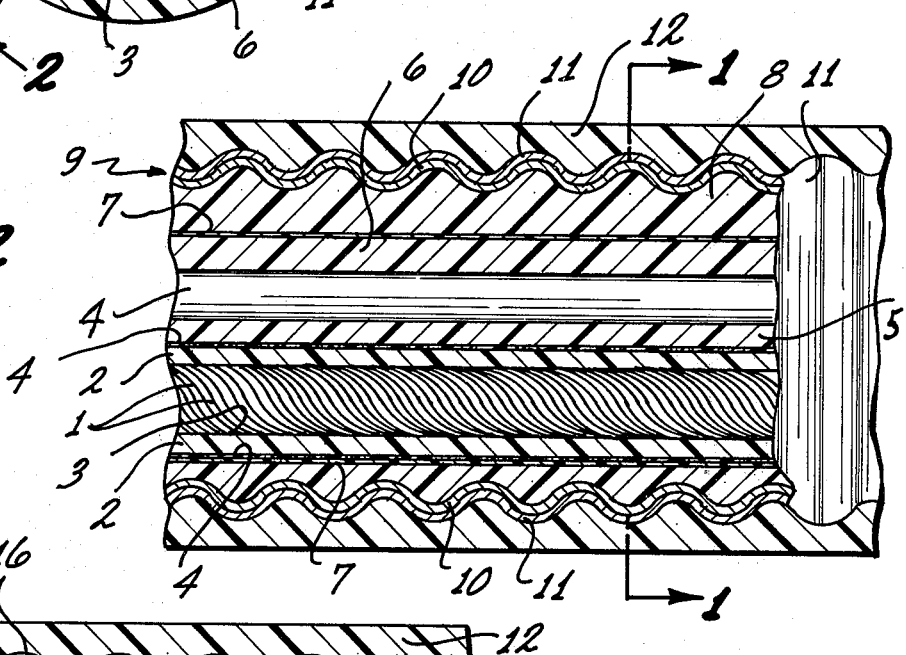

Proceeding now to the detailed description of the drawings, the Figures illustrate a plurality of altogether three conductors 1, each of which is being comprised of a multitude of stranded-together filaments or wires. Each conductor, moreover, is enveloped by an insulation 2 being, for example, cross-linked polyethylene. There is, however, a conductive smoothing layer 3 provided around each filament bundle. The insulation, in turn, is coated with another conductive or semiconductive layer 4. The resulting three-conductor bundle is also stranded.

The configuration as described thus far is preferred for most instances; but other applications and intended uses may render it advisable to use oval conductors or conductors of sector-shaped cross sections.

The gap space at and near the conductors 1 as insulated receive insulated filter strands 5 and 6. The resulting element is held together (in addition to stranding) by means of conductive ribbons 7 wrapped around the bundle. An inner jacket 8 is extruded onto and around that bundle. The jacket is preferably made of a rubber elastic but conductive (i.e., semiconductive material). In other words, the material employed is, e.g., an elastomeric material to which a conductive substances, such as graphite or carbon black, has been added. The base material is, for example, natural or synthetic rubber or a thermoplastic rubber.

This rubber core is now enveloped in a closed, metallic, annularly corrugated tube 9. This tube is comprised of an inner, primarily conductive part 10 (preferably made of copper or aluminum), and an outer, primarily mechanically resistive part 11, preferably made of steel. The inner part 10 is in electrically conductive contact with the jacket 9. This twin- or dual-corrugated tube 9 is made as follows.

After the cable core (1 through 8) has been assembled and completed, a longitudinally paid copper (or aluminum) strip or ribbon, being about 0.3 mm to 0.5 mm thick, is longitudinally folded about that core, particularly on the jacket 8, and the edges of the copper strip are then welded to form a closed tube.

Next, a steel strip of about 0.5 mm to 0.7 mm thickness is paid to run toward the assembly and is also folded longitudinally about a tube and welded along its seams. Thus, one forms a steel tube on top of and around the copper tube. Subsequently, this twin tube assembly is corrugated. Since the two tubes are corrugated together, their respective grooves and ridges are, of course, geometrically and physically in contour-matching relation with each other.

It should be noted that preferably a drawing step is interposed, to draw the steel tube onto and into intimate contact with the copper tube so that the assembly is more or less a two-ply tube; but there is no metallurgical bond between the tubes. The purpose here is that, upon closely seating the outer steel tube on the inner copper tube, one avoids turning of the latter when corrugation is applied to the outer tube.

The assembly is completed by corrosion-proofing the outer tube, e.g., by means of a synthetic jacket 12 being, for example, comprised of or including polyvinyl chloride.

The cable of the type described above can be used, for example, as a three-phase power cable for low and median voltages. The cable is protected against moisture to such an extent that the principle can readily be applied to high-voltage cables, possibly in a single or two conductor configuration. In each case, one has adequate shielding by the copper tube 9 which is in intimate electric contact with the conductive jacket 8. Conceivably, the jacket 8 may be comprised of a true insulating material which is coated with a semiconductive or conductive material. The corrugation grooves of the twin tube 9 make good contact with the exterior of that jacket.

The corrugation, moreover, has also a sealing effect, whereby particularly the annular configuration of that corrugation is akin to a bulkhead-partioning of the interior.

Figure 3:
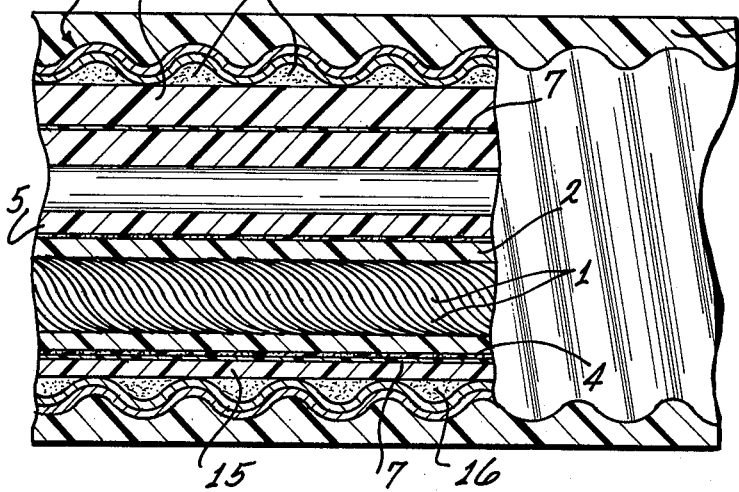
FIG. 3 is a view, similar to FIG. 2, but showing a modification.

FIG. 3 illustrates an alternative configuration. The cable core is provided with a nonelastic or not too elastic outer layer 15, and foam or other very resilient material 16 is deposited in between. The two-tube assembly 19 in this case has a helical corrugation; and the substance 16 is, possibly, of the type or includes a material that is capable of swelling when in contact with moisture. This is an alternative way of longitudinally sealing the interior of the tube against migration of moisture, should such moisture have entered the cable at an unexpectedly defective location. The material 16 may also be a paste, e.g., on a rubber base, or any other known and suitable sealer.

The invention is not limited to the embodiments described above; but all changes and modifications thereof, not constituting departures from the spirit and scope of the invention, are intended to be included.

We claim:

1. A moisture-proof cable, comprising:
a plurality of inner conductors assembled in a stranded bundle;
an insulating jacket assembly around the conductor bundle and constituting therewith a cable core; and
a twin tube comprised of two thin metal strips, a first one having been longitudinally folded around the core and seam-welded along edges of the first strip, a second one of the strips having been longitudinally folded around the first one and seam-welded along its edges, the first one having a higher electrical conductivity but a lower mechanical resistance than the second, outer one, the twin tube having corrugations commonly made in situ and which extend into the jacket in order to obtain longitudinal sealing against the migration of moisture.

2. A moisture-proof cable, comprising:
an inner conductor being comprised of a plurality of stranded-together wires;
an insulating jacket assembly around the conductor and constituting therewith a cable core; and
a twin tube comprised of two thin metal strips, a first one of the strips having been longitudinally folded around the core and longitudinally seam-welded along its edges, a second one of the strips having been longitudinally folded around the first one and longitudinally seam-welded along its edges, the first one having a higher electrical conductivity but a lower mechanical resistance than the second, outer one, the twin tube having corrugations commonly made in situ and which extend into the jacket in order to obtain longitudinal sealing against the migration of moisture.

3. A cable as in claim 1 or 2, the outer tube being made of steel, the inner one of copper or aluminum.

4. A cable as in claim 3, the strips having a thickness in the range of from 0.2 mm to 1.2 mm.

5. A cable as in claim 3, the strips having a thickness in the range of from 0.4 mm to 0.8 mm.

6. A cable as in claim 1 or 2, wherein corrugations grooves of the twin tube are annular grooves, being forced into said jacket, the jacket being of an elastic material.

7. A cable as in claim 1 or 2, wherein the outer tube has been drawn onto the inner tube.

8. A cable as in claim 1 or 2, the jacket assembly including a relatively inelastic material on the core, the space in between corrugations and the latter material being filled with a moisture sealer.

* * * * *